(12) United States Patent
Bartz et al.

(10) Patent No.: US 11,171,833 B1
(45) Date of Patent: Nov. 9, 2021

(54) PROTECTED RESET FOR NETWORK DEVICE

(71) Applicant: Rockwell Automation Technologies, Inc., Mayfield Heights, OH (US)

(72) Inventors: William A. Bartz, Mequon, WI (US); August Schrab, Mequon, WI (US); Robert Alexander, Mequon, WI (US); Scott D. Braun, Mequon, WI (US); Kurt R. Hohensee, Mequon, WI (US); Mohammadreza Serjooei, Mequon, WI (US); James B. Vitrano, Mequon, WI (US); Jaime D. Fernandes, Mequon, WI (US); Sivaram Balasubramanian, Mayfield Heights, OH (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 0 days.

(21) Appl. No.: 17/037,096

(22) Filed: Sep. 29, 2020

(51) Int. Cl.
*H04L 12/24* (2006.01)
*H04L 12/931* (2013.01)

(52) U.S. Cl.
CPC ........ *H04L 41/082* (2013.01); *H04L 41/0836* (2013.01); *H04L 41/0886* (2013.01); *H04L 41/0893* (2013.01); *H04L 49/35* (2013.01)

(58) Field of Classification Search
CPC .............. H04L 41/082; H04L 41/0836; H04L 41/0886; H04L 41/0893; H04L 49/35; H04L 45/28; H04L 63/0853; H04L 9/0861; G06F 21/554; G06F 21/72; H01H 9/287; H04M 17/02

See application file for complete search history.

(56) References Cited

U.S. PATENT DOCUMENTS

| | | | |
|---|---|---|---|
| 2002/0041665 A1* | 4/2002 | Meyer ................... | H04M 17/02 379/145 |
| 2007/0007114 A1* | 1/2007 | Liu ........................ | H01H 9/287 200/43.01 |
| 2012/0185680 A1* | 7/2012 | Buer ....................... | G06F 21/72 713/1 |
| 2017/0195216 A1* | 7/2017 | Ramachandran ....... | H04L 45/28 |
| 2017/0222815 A1* | 8/2017 | Meriac .................. | G06F 21/554 |
| 2017/0337390 A1* | 11/2017 | Hamilton .............. | H04L 9/0861 |
| 2018/0004956 A1* | 1/2018 | Bertorelle ........... | H04L 63/0853 |

* cited by examiner

Primary Examiner — Le H Luu
(74) Attorney, Agent, or Firm — Kunzler Bean & Adamson; Scott D. Thorpe

(57) ABSTRACT

For uninterrupted network communications, a method detects a protected reset at a network device. In response to the protected reset, the method maintains communication functions of a communication module. The communication module communicates with other network devices using the communication functions. In response to the protected reset, the method resets the network device without resetting the communication module.

20 Claims, 8 Drawing Sheets

PROTECTED RESET FOR NETWORK DEVICE

BACKGROUND INFORMATION

The subject matter disclosed herein relates to uninterrupted network communications.

BRIEF DESCRIPTION

A method for uninterrupted network communications is disclosed. The method detects a protected reset at a network device. In response to the protected reset, the method maintains communication functions of a communication module. The communication module communicates with other network devices using the communication functions. In response to the protected reset, the method resets the network device without resetting the communication module.

An apparatus for uninterrupted network communications is also disclosed. The apparatus includes hardware components, a memory, and/or a processor. The apparatus detects a protected reset at a network device. In response to the protected reset, the apparatus maintains communication functions of a communication module. The communication module communicates with other network devices using the communication functions. In response to the protected reset, the apparatus resets the network device without resetting the communication module.

A computer program product for uninterrupted network communications is disclosed. The computer program product includes a non-transitory computer readable storage medium having program code embodied thereon. The program code is readable/executable by a processor. The processor detects a protected reset at a network device. In response to the protected reset, the processor maintains communication functions of a communication module. The communication module communicates with other network devices using the communication functions. In response to the protected reset, the processor resets the network device without resetting the communication module.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
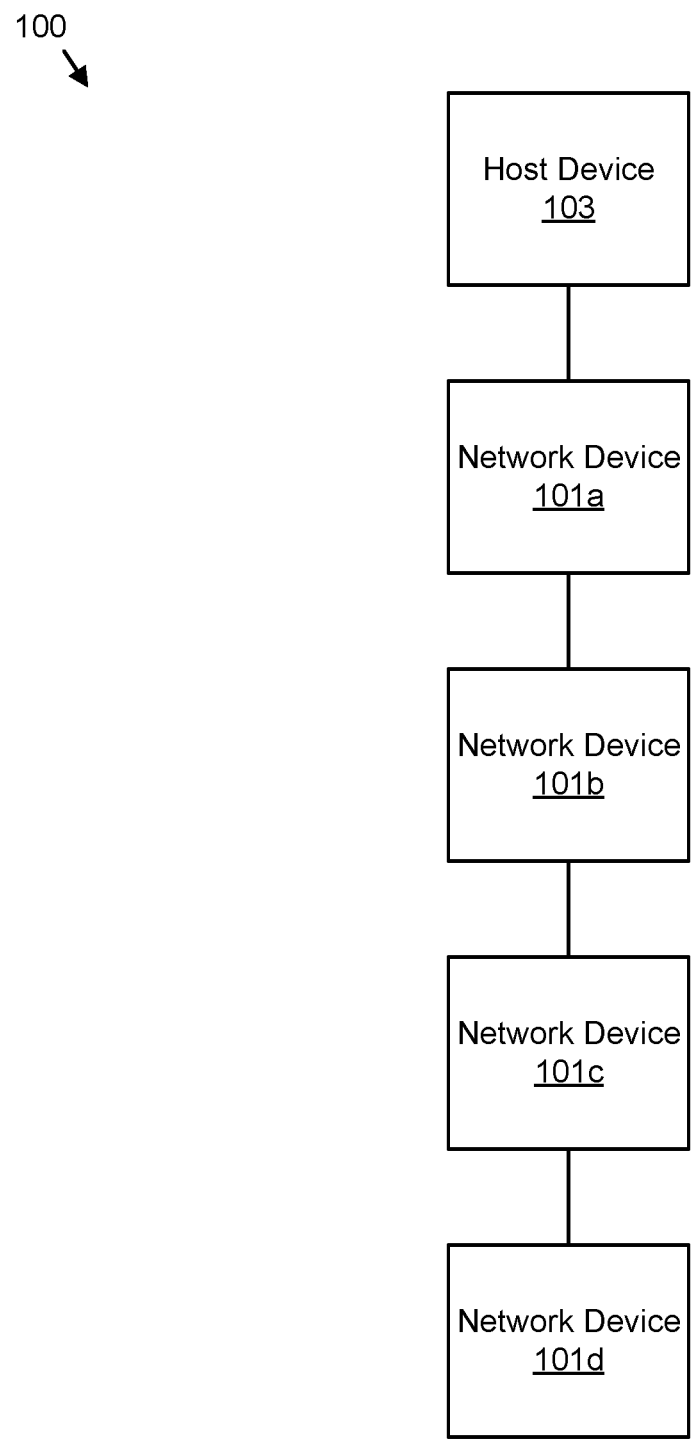
FIG. 1A is a schematic block diagram of a network according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wireline, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Ruby, R, Java, Java Script, Smalltalk, C++, C sharp, Lisp, Clojure, PHP or the like and conventional procedural programming languages, such as the "C" programming language or similar programming languages. The program code may execute entirely on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server, and network environment by providing for the computer program product to coexist with applications, operating systems, and network operating systems software and then installing the computer program product on the clients and servers in the environment where the computer program product will function. In one embodiment, software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of preceding figures. Like numbers refer to like elements in all figures, including alternate embodiments of like elements.

FIG. 1A is a schematic block diagram of a network 100. In the depicted embodiment, the network 100 is organized as a linear network. The network 100 includes a host device 103 and a plurality of network devices 101. The network 100 may provide communications for industrial automation. In one embodiment, the network 100 is an Ethernet network 100.

Each network device 101 may include two or more ports. The two or more ports support the reduction of wiring costs for the network 100 as each network device 101 may be connected to a plurality of other devices 101/103. The host device 103 may initiate a communication to a second network device 101*b* by communicating a message to a first network device 101*a*. The first network device 101*a* may communicate the message to the second network device 101*b*. In addition, the second network device 101*b* may respond to the message by communicating response to the first network device 101*a*. The first network device 101*a* may subsequently communicate the response to the host device 103. As a result, communications between any two devices 101/103 requires the active participation of any intervening devices 101/103.

Unfortunately, when a device 101/103 is resetting, is powered off, and/or is being powered on, hereafter referred to collectively as being reset, the device 101/103 is nonoperational and is unable to communicate messages for the network 100. The embodiments described herein detect a protected reset at a network device 101. In response to the protected reset, the embodiments maintain communication functions with other devices 101/103. As a result, the function of the network 100 is not impaired. In addition, the embodiments reset the network device 101 without resetting and/or interrupting the communications functions as will be described hereafter. As a result, the functionality of the network 100 is enhanced.

Figure 1B:
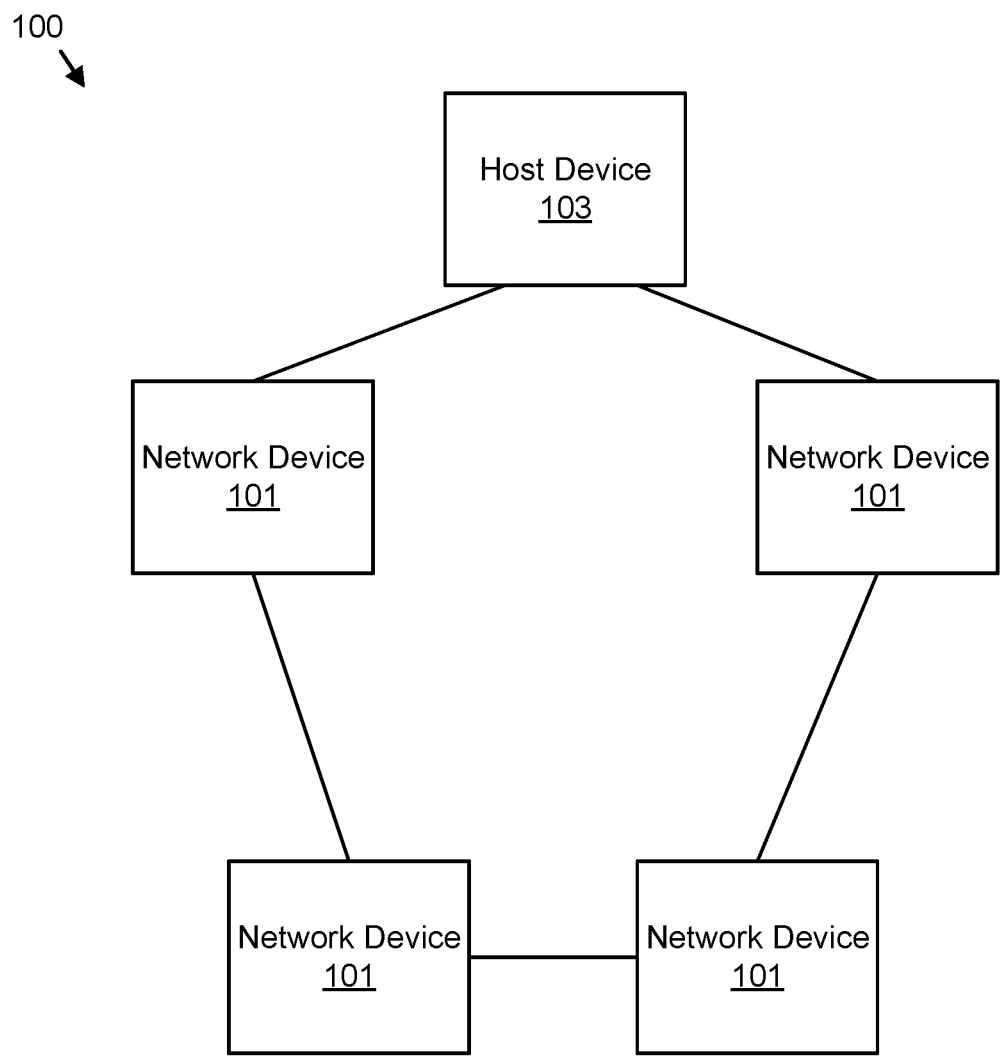
FIG. 1B is a schematic block diagram of a network according to an alternate embodiment.

FIG. 1B is a schematic block diagram of a network 100. In the depicted embodiment, the network 100 is organized as a ring network. The network 100 includes the host device 103 and the plurality of network devices 101. The network 100 may provide communications for industrial automation and may be an Ethernet network 100.

As depicted in FIG. 1B, each network device 101 may include two or more ports and communications between devices 101/103 may be received and retransmitted by intervening devices 101/103. As a result, communications between any two devices 101/103 requires the active participation of any intervening devices 101/103.

Figure 2:
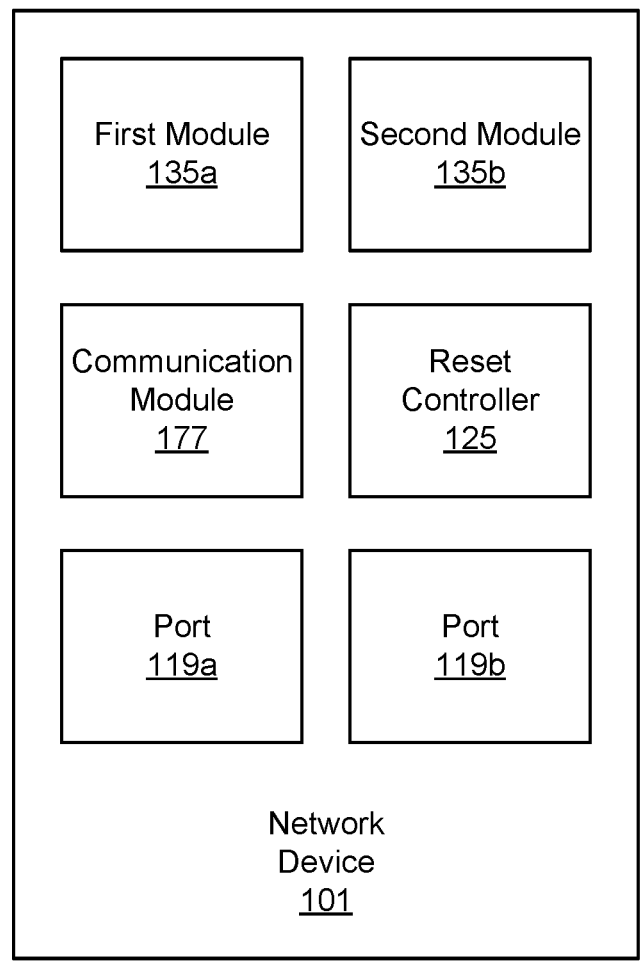
FIG. 2 is a schematic block diagram of a network device according to an embodiment.

FIG. 2 is a schematic block diagram of a network device 101. In the depicted embodiment, the network device 101 includes at least one module 135, a communication module 177, a reset controller 125, and at least one port 119.

The modules 135 may perform specific functions for the network device 101. In one exemplary embodiment, the first module 135*a* may be a control system and the second module 135*b* may be a configurable device such as a Field Programmable Gate Array (FPGA) and/or a memory. Although for simplicity two modules 135 are shown, any number of modules 135 may be employed.

The communication module 177 may communicate with the network 100. The communication module 177 may communicate with other network devices 101 using communication functions. The communication functions may be Ethernet functions. In one embodiment, the Ethernet functions conform to at least one of the Institute of Electrical and Electronics Engineers (IEEE) 802.3 standards as of the filing date of the present application.

In one embodiment, the communication module 177 communicates via at least one port 119. For example, the communication module 177 may receive a message via the first port 119*a*. The communication module 177 may further determine whether the network device 101 is the final destination for the message. If the network device 101 is the final destination for the message, the communication module 177 routes the message within the network device 101. However, if the network device 101 is not the final destination for the message, the communication module 177 may route the message to downstream network device 101 via the second port 119*b*.

The reset controller 125 detects the protected reset at the network device 101. In addition, the reset controller 125 maintains the communication functions of the communication module 177, so that the communication module 177 communicates to other network devices 101 using the communications functions. In addition, the reset controller 125 may reset the network device 101 without resetting the communication module 177 as will be described hereafter.

Figure 3:
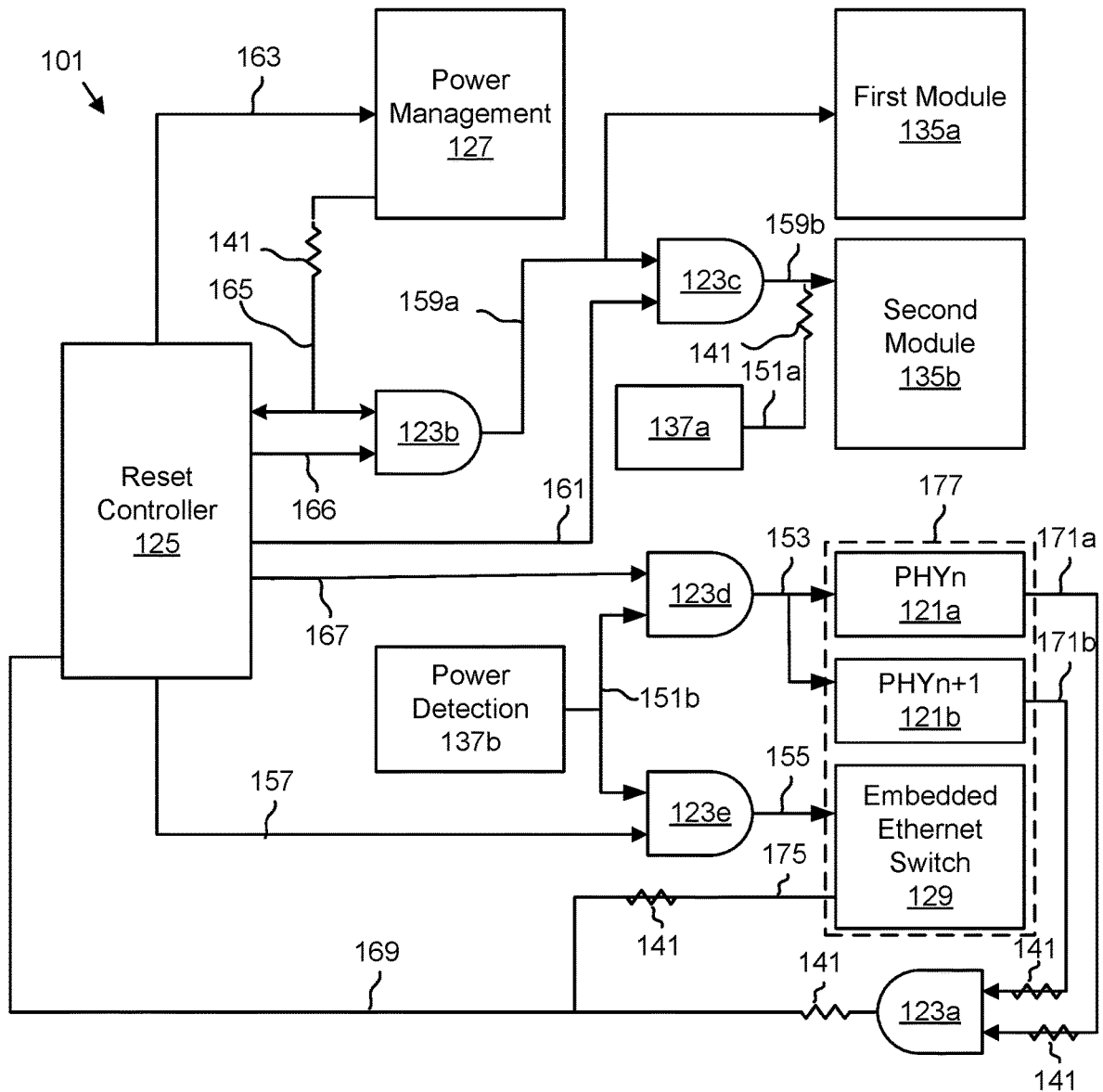
FIG. 3 is a schematic block diagram of a network device according to an alternate embodiment.

FIG. 3 is a schematic block diagram of the network device 101. The reset controller 125 and communication module 177 of FIG. 2 are shown. The communication module 177 includes two physical layers 121*a-b* and an embedded Ethernet switch 129. The first module 135*a* may be a controller and the second module 135*b* may be an FPGA. The reset controller 125 detects the protected reset and maintains the communication functions of the communication module 177 while resetting the network device 101.

In the depicted embodiment, the reset controller 125 receives a communications active 169 and a reset 165 and generates a shutdown command 163, a controller reset 166, an FPGA reconfigure 161, a physical system reset 167, and a switch reset 157. Power detection circuits 137 may generate one or more power good 151 signals. The network device 101 further includes logical AND gates 123 and resistors 141. The resistors 141 may function as buffering resistors and/or pull-up/down resistors.

The embedded Ethernet switch 129 generates an interface active 175 if the embedded Ethernet switch 129 is actively communicating via the physical layers 121 with another device 101/103. As used herein, actively communicating is exchanging packets between the physical layers 121. The interface active 175 may be an interrupt. A first AND gate 123*a* monitors the physical interfaces 171*a-b* of the physical layers 121*a-b*. In a certain embodiment, the physical interfaces 171*a-b* are interrupts. The first AND gate 123*a* may monitor for an interrupt. Alternatively, the first AND gate 123*a* may monitor for active communications. The communications active 169 signal is asserted if any of the physical interfaces 171*a-b* and interface active 175 are asserted. Alternatively, the communications active 169 signal is asserted if all of the physical interfaces 171*a-b* and interface active 175 are asserted. The communications active 169 may indicate that the communication module 177 is communicating with other devices 101/103.

In the depicted embodiment, the network device 101 includes power management 127. The power management 127 generates the reset 165. The reset 165 may indicate that the network device 101 is about to be reset. In one embodiment, the reset 165 is a power reset. In response to the reset 165, the reset controller 125 determines whether the reset 165 is the protected reset as will be described hereafter.

If the reset is not a protected reset, the reset controller 125 may generate the shutdown command 163 and the power management 127 may reset the network device 101. In addition, the reset controller 125 may selectively reset one or more of the first module 135*a*, the second module 135*b*, the physical layers 121*a-b*, and the embedded Ethernet switch 129 as will be described hereafter.

If the reset is a protected reset, the reset controller 125 may selectively reset one or more of the first module 135*a* and/or the second module 135*b*. In the depicted embodiment, the reset controller 125 resets the first module 135*a* by generating the controller reset 166. A first module reset 159*a* is generated by a second AND gate 123*b* in response to the controller reset 166 and the reset 165, resetting the first module 135*a*. In one alternate embodiment, the controller reset 166 asserted low generates a second module reset signal 159*b*. In addition, the reset controller 125 may reset the second module 135*b* by asserting the FPGA reconfigure 161. A second module reset 159*b* may be generated by a third AND gate 123*c* in response to the FPGA reconfigure 161 and the first module reset 159*a* being asserted. In addition, the second module reset 159*b* may be generated in response to the FPGA reconfigure 161, the first module reset 159*a*, and the power good 151*a* being asserted. The reset controller 125 may not assert the physical system reset 167 and the switch reset 157. As a result, the physical layers 121*a-b* and the embedded Ethernet switch 129 maintain communication functions for the network device 101.

In one embodiment, the reset controller 125 selectively resets the physical layers 121*a-b*. The reset controller 125 may assert the physical system reset 167. The physical system reset 167 may generate via a fourth AND gate 123*d* a physical layer reset 153 that resets the physical layers 121*a-b*. In the depicted embodiment, the physical layer reset 153 is generated in response to asserting the physical system reset 167 and the power good 151*b* being asserted. In a certain embodiment, the physical system reset 167 is only asserted if communications active 169 is not asserted.

In one embodiment, the reset controller 125 selectively resets the embedded Ethernet switch 129. The reset controller 125 may assert the switch reset 157. The switch reset 157 may generate via a fifth AND gate 123*e* a communications controller reset 155. In the depicted embodiment, the communications controller reset 155 is generated in response to asserting the switch reset 157 and the power good 151*b* being asserted. In a certain embodiment, the switch reset 157 is only asserted if communications active 169 is not asserted.

Figure 4A:
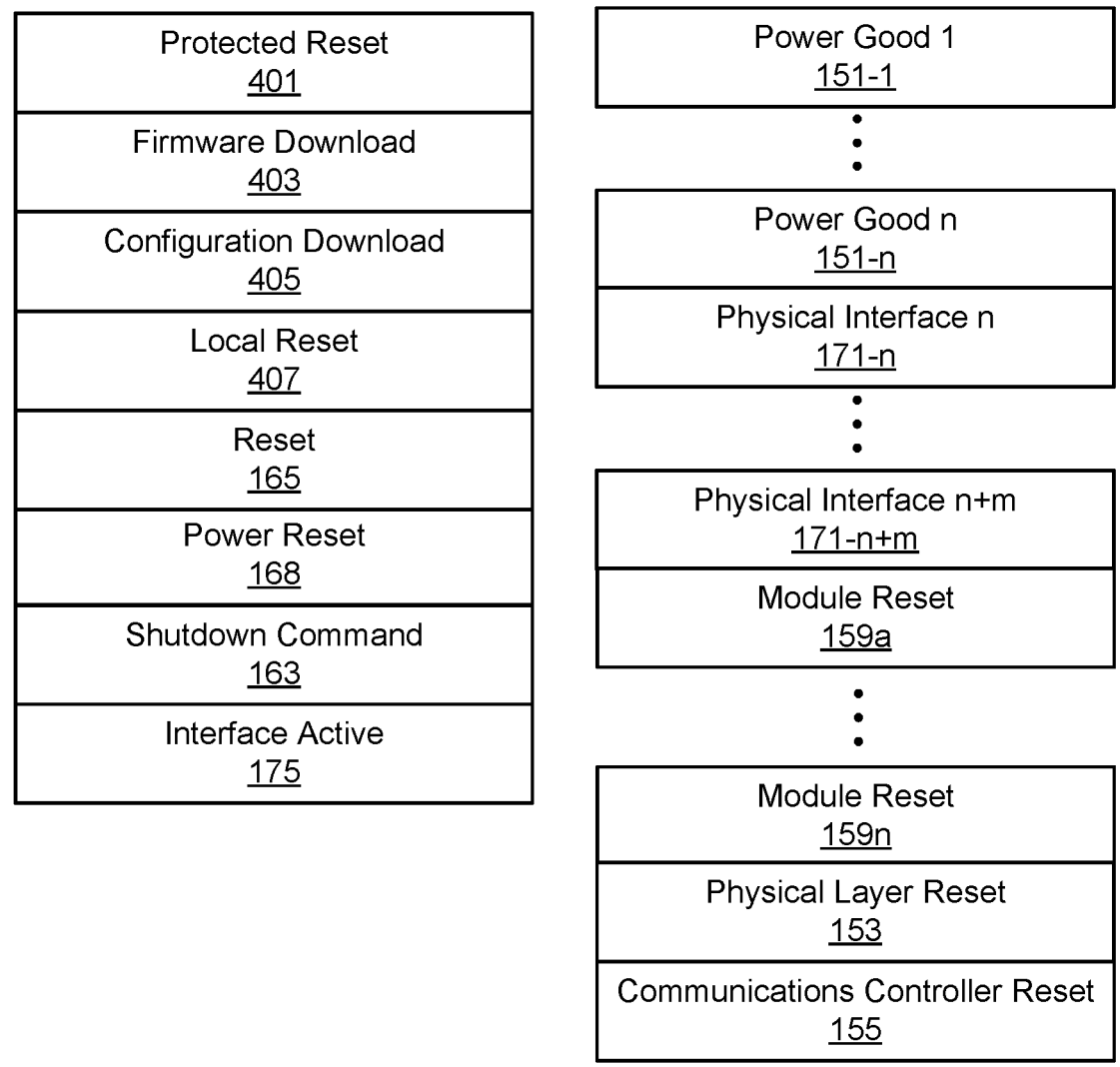
FIG. 4A is a schematic block diagram of network data according to an embodiment.

FIG. 4A is a schematic block diagram of network data 200. The network data 200 may be used to identify the protected reset 401. In addition, the network data 200 may be used to selectively reset portions of the network device 101. The network data 200 may be organized as a data structure in a memory. In the depicted embodiment, the network data 200 includes the protected reset 401, a firmware download 403, a configuration download 405, a local reset 407, the reset 165, a power reset 168, the shutdown command 163, the interface active 175, one or more power good 151, one or more physical interface 171, one or more module reset 159, the physical layer reset 153, and the communications controller reset 155. The network data 200 may employ any or all of the protected reset 401, the firmware download 403, the configuration download 405, the local reset 407, the reset 165, the power reset 168, the shutdown command 163, the interface active 175, the one or more power good 151, the one or more physical interface 171, the one or more module reset 159, the physical layer reset 153, and the communications controller reset 155.

The firmware download 403 may indicate that firmware was downloaded to the network device 101. In addition, the firmware download 403 may be update code stored to a memory. In one embodiment, the firmware download 403 indicates that firmware was downloaded to the network device 101 since the last reset. The firmware download 403 may be set in response to downloading firmware to the network device 101. In addition, the firmware download 403 may be cleared in response to resetting the network device 101 and/or a module 135 receiving the firmware.

The configuration download 405 may indicate that a configuration was downloaded to an FPGA module 135, a configurable module 135, the network device 101, and the like. In addition, the configuration download 405 may be update code stored to a memory. In one embodiment, the configuration download 405 indicates that the configuration was downloaded to the network device 101 since the last reset. The configuration download 405 may be set in response to downloading the configuration to the network device 101. In addition, the configuration download 405 may be cleared in response to resetting the network device 101 and/or a module 135 receiving the configuration.

The local reset 407 may indicate a soft reset for the network device 101. The local reset 407 may be received by the network device 101.

The reset 165 may be received by the reset controller 125. The reset 165 may indicate a reset for the network device 101. The interface active 175 may be received by the reset controller 125.

The interface active 175 may indicate that the communication module 177 is actively communicating with other devices 101/103. The power good 151 may be received by the reset controller 125 and indicate acceptable power for portions of the network device 101.

The power reset 168 may be received by the reset controller 125. In one embodiment, the power reset 168 is the reset 165. In an alternative embodiment, the power reset 168 is separate from the reset 165. In one embodiment, the module reset 159, the physical layer reset 153, and the communications controller reset 155 are each generated in response to the power reset 168.

The physical interface 171 may be received by the reset controller 125. The physical interface 171 may indicate that the corresponding physical layer 121 is actively communicating with other devices 101/103.

The reset controller 125 may generate the shutdown command 163 when it is safe to reset and/or power down the network device 101. In one embodiment, the shutdown command 163 is asserted if the interface active 175, the physical interface 171, and/or the communications active 169 are not asserted.

The protected reset 401 may be detected and/or asserted in response to a need to maintain the communication functions of the communication module 177. In one embodiment, the protected reset 401 is detected in response to the reset 165 and the firmware download 403. In a certain embodiment, the protected reset 401 is detected in response to the reset 165 and the configuration download 405. In addition, the protected reset 401 may be detected in response to the local reset 407. In one embodiment, the protected reset 401 is detected in response to the reset 165 and the local reset 407.

Table 1 illustrates exemplary combinations of signals that may result in asserting and/or setting the protected reset 401. A '1' indicates an asserted signal, '0' indicates a deasserted signal, and 'X' indicates a don't care. The combinations may be mutually exclusive.

TABLE 1

| 165 | 403 | 405 | 407 | 169 | 175 | 171 | 401 |
|---|---|---|---|---|---|---|---|
| 0 | 0 | 0 | 0 | X | X | X | 0 |
| 1 | 1 | X | X | X | 0 | X | 1 |

TABLE 1-continued

| 165 | 403 | 405 | 407 | 169 | 175 | 171 | 401 |
|---|---|---|---|---|---|---|---|
| 1 | 1 | X | X | X | 1 | X | 1 |
| 1 | 1 | X | X | X | X | 0 | 1 |
| 1 | 1 | X | X | X | X | 1 | 1 |
| 1 | 1 | X | X | 0 | X | X | 1 |
| 1 | 1 | X | X | 1 | X | X | 1 |
| 1 | X | 1 | X | X | 0 | X | 1 |
| 1 | X | 1 | X | X | 1 | X | 1 |
| 1 | X | 1 | X | X | X | 0 | 1 |
| 1 | X | 1 | X | X | X | 1 | 1 |
| 1 | X | 1 | X | 0 | X | X | 1 |
| 1 | X | 1 | X | 1 | X | X | 1 |
| X | X | X | 1 | X | 0 | X | 1 |
| X | X | X | 1 | X | 1 | X | 1 |
| X | X | X | 1 | X | X | 0 | 1 |
| X | X | X | 1 | X | X | 1 | 1 |
| X | X | X | 1 | 0 | X | X | 1 |
| X | X | X | 1 | 1 | X | X | 1 |

The module resets 159, physical layer reset 153, and communications controller reset 155 may be generated in response to one or more of the protected reset 401, the firmware download 403, the configuration download 405, the local reset 407, the reset 165, the shutdown command 163, the interface active 175, the power good 151, and the physical interface 171. Table 2 illustrates exemplary combinations of signals that may result in an asserting and/or setting module resets 159, physical layer reset 153, and communications controller reset 155. The combinations may be mutually exclusive.

TABLE 2

| 165 | 401 | 403 | 405 | 407 | 169 | 175 | 171 | 159a | 159b | 153 | 155 |
|---|---|---|---|---|---|---|---|---|---|---|---|
| 0 | X | X | X | 0 | X | X | X | 0 | 0 | 0 | 0 |
| 0 | X | X | X | 1 | X | X | X | 1 | 1 | 0 | 0 |
| 1 | 1 | 0 | 0 | 0 | X | X | X | 1 | 1 | 0 | 0 |
| 1 | 1 | 1 | 0 | 0 | X | X | X | 1 | 0 | 0 | 0 |
| 1 | 1 | 0 | 1 | 0 | X | X | X | 0 | 1 | 0 | 0 |
| 1 | 0 | X | X | 0 | 1 | 0 | 0 | 1 | 1 | 0 | 0 |
| 1 | 0 | X | X | 0 | 0 | 1 | 0 | 1 | 1 | 0 | 0 |
| 1 | 0 | X | X | 0 | 0 | 0 | 1 | 1 | 1 | 0 | 0 |
| 1 | 0 | X | X | 0 | 0 | 0 | 0 | 1 | 1 | 1 | 1 |
| 1 | 1 | X | X | 0 | 0 | 0 | 0 | 1 | 1 | 0 | 1 |
| 1 | 1 | X | X | 0 | 0 | 0 | 1 | 1 | 1 | 0 | 1 |
| 1 | 1 | X | X | 0 | 0 | 0 | 0 | 1 | 1 | 1 | 0 |
| 1 | 1 | X | X | 0 | 0 | 0 | 1 | 1 | 1 | 1 | 0 |

Figure 4B:
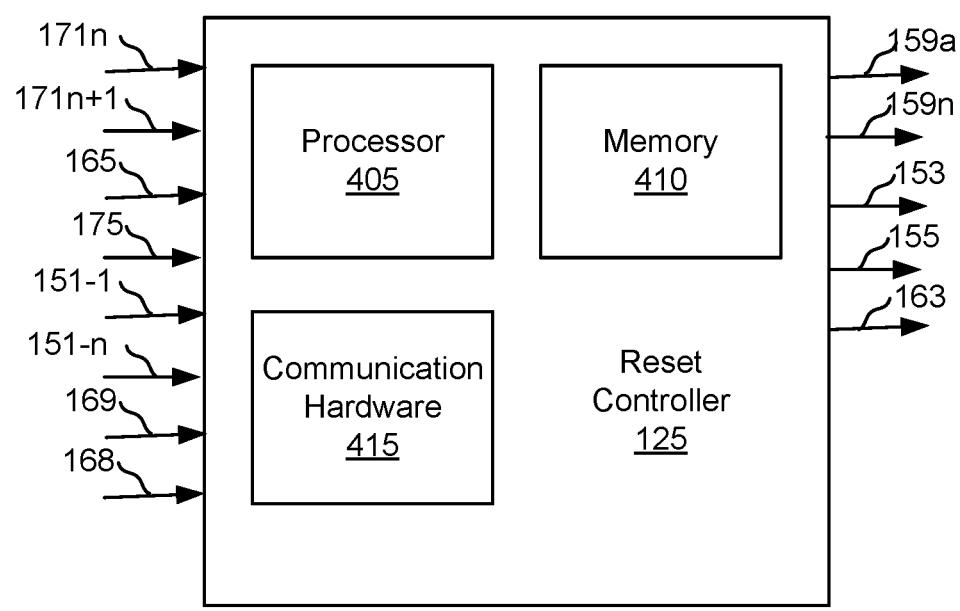
FIG. 4B is a schematic block diagram of a reset controller according to an embodiment.

FIG. 4B is a schematic block diagram of a reset controller 125. In the depicted embodiment, the reset controller 125 includes a processor 405, a memory 410, and communication hardware 415. The memory 410 may store code and data. The processor 405 may execute the code and process the data. The communication hardware 415 may communicate with other devices and/or components. In the depicted embodiment, the communication hardware 415 receives one or more physical interfaces 171, the reset 165, the interface active 175, one or more of the power good 151, the power reset 168, and the communications active 169. The communication hardware 415 may generate one or more module resets 159, the physical layer reset 153, the communications controller reset 155, and the shutdown command 163. The communication hardware 415 may receive some or all of the depicted signals. In addition, the communication hardware 415 may generate some or all of the depicted signals.

Figure 5A:
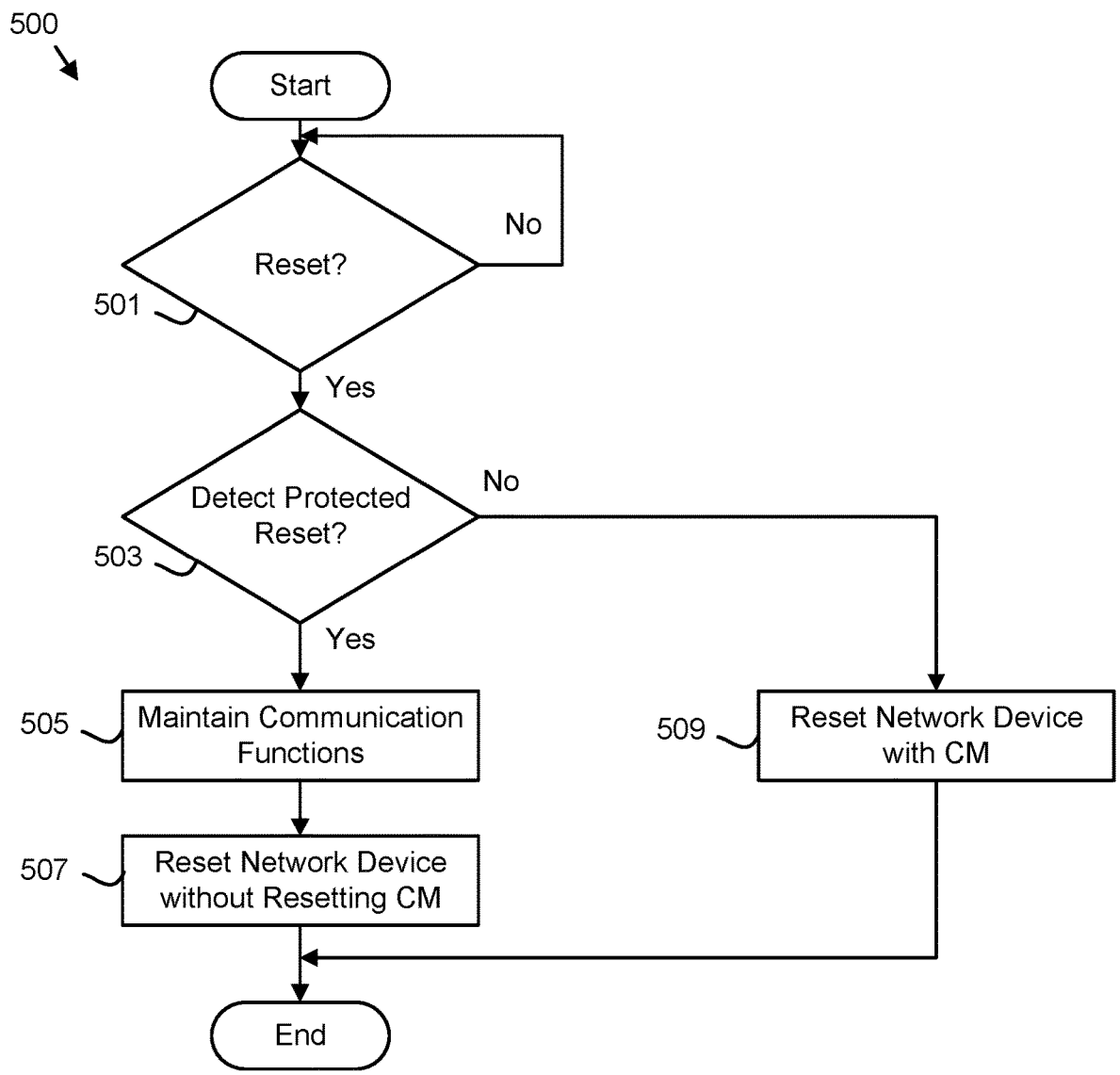
FIG. 5A is a flow chart diagram of an uninterrupted communication method according to an embodiment.

FIG. 5A is a flow chart diagram of an uninterrupted communication method 500. The method 500 may maintain uninterrupted communications in the network 100. In response to the protected reset, the method 500 maintains communication functions while the host device 103 implements the reset. The communication module 117 continues to communicate with other network devices 101 using standard communication functions. In response to the protected reset, the method 500 functionally resets the network device 101 without resetting or affecting the physical communications. The method may be performed by the reset controller 125.

The method 500 starts, and in one embodiment, the reset controller 125 detects 501 a reset. The reset may be the reset 165. In addition, the reset may be the local reset 407. In one embodiment, the reset is the power reset 168.

The reset controller 125 further determines 503 if the reset is a protected reset 401. The protected reset 401 may be a firmware update reset in response to the firmware download 403 for the network device 101. In one embodiment, the reset is a protected reset 401 if the firmware download 403 is asserted. The reset may be a protected reset 401 if the firmware download 403 was asserted since the last reset. For example, the firmware download 403 may be cleared after each reset.

In addition, the protected reset 401 may be a configuration update reset in response to the configuration download 405 for the network device 101. The reset may be a protected reset 401 if the configuration download 405 is asserted. The reset may be a protected reset 401 if the configuration download 405 was asserted since the last reset. For example, the configuration download 405 may be cleared after each reset.

In a certain embodiment, the protected reset 401 is the local reset 407. The reset may be a protected reset 401 if the local reset 407 is asserted. For example, each local reset 407 may be a protected reset 401.

In one embodiment, the reset is a protected reset 401 if the communications active 169 is asserted. In addition, the reset may be a protected reset 401 if the interface active 175 is asserted. The reset may be a protected reset 401 if the physical interface 171 is asserted.

If the protected reset 401 is not detected 503, the reset controller 125 resets 509 the network device 101 with the communication module 177 and the method 500 ends. In one embodiment, the reset controller 125 asserts each of the module resets 159, the physical layer reset 153, the communications controller reset 155, and the shutdown command 163. The communication module 177 may be reset in response to the reset 165.

If the protected reset 401 is detected 503, the reset controller 125 maintains the communication functions of the communication module 177. The communication module 177 communicates with other network devices 101 using the communication functions. The reset controller 125 further resets the network device 101 without resetting the communication module 177. In one embodiment, the reset controller 125 asserts each of the module resets 159.

In one embodiment, a module 135 receiving the configuration download 405 is reset 509. In a certain embodiment, only a module 135 receiving the configuration download 405 is reset 509. For example, if an FPGA module 135 receives the configuration download 405, only the FPGA module 135 is reset 509.

In one embodiment, a module 135 receiving a firmware download 403 is reset 509. In a certain embodiment, only a module 135 receiving the firmware download 403 is reset 509. For example, if a controller module 135 receives the firmware download 403, only the controller module 135 is reset 509.

In a certain embodiment, one of the embedded Ethernet switch 129 and the at least two Ethernet physical layers 121 are reset in response to detecting the protected reset 401.

Figure 5B:
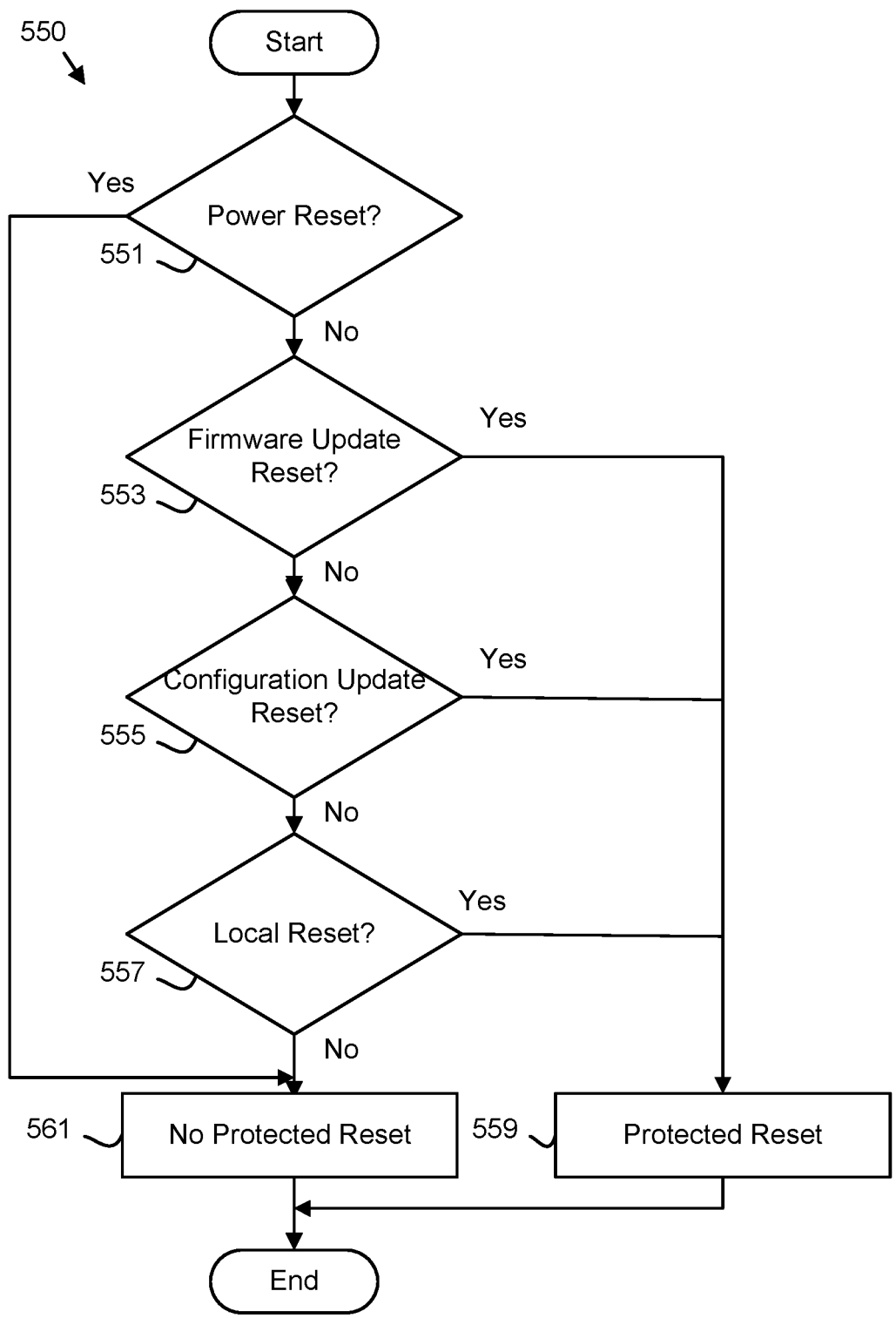
FIG. 5B is a flow chart diagram of a protected reset detection method according to an embodiment.

FIG. 5B is a flow chart diagram of a protected reset detection method 550. The method 550 may determine the protected reset 401 for step 503 of FIG. 5A. The method 550 may be performed by the reset controller 125.

The method 550 starts, and in one embodiment, the reset controller 125 determines 551 whether the reset 165 is a power reset 168. If the reset 165 is the power reset 168, no protected reset 401 is detected 561 and the method 550 ends.

If the reset 165 is not the power reset 168, the reset controller 125 determines 553 if the reset 165 is a firmware update reset. In one embodiment, the reset controller 125 checks the firmware download 403 to determine if the reset 165 is a firmware update reset. If the firmware download 403 is asserted and/or the firmware download 403 is received, the reset 165 is the firmware update reset and the protected reset 401 is detected 559.

If the reset 165 is not a firmware update reset, the reset controller 125 determines 555 whether the reset 165 is a configuration update reset. In one embodiment, the reset controller 125 checks the configuration download 405 to determine if the reset 165 is the configuration update reset. If the configuration download 405 is asserted and/or the configuration download 405 is received, the reset 165 is the configuration update reset and the protected reset 401 is detected 559.

If the reset 165 is not the configuration update reset, the reset controller 125 determines 557 whether the reset 165 is the local reset 407. The local reset 407 may be received from the host device 103 via the network 100. If the reset 165 is not the local reset 407, no protected reset 401 is detected 561 and the method 550 ends. If the reset 165 is the local reset 407, the protected reset 401 is detected 559 and the method 550 ends.

PROBLEM/SOLUTION

In the past, resetting the network device 101 resulted in the network 100 being unavailable for communications. As a result, other devices 101/103 are unable to communicate over the network 100. However, some resets 165, such as after a firmware download 403 and/or configuration download 405 do not require that the network device 101 terminate communication functions. The embodiments detect the protected reset 401 at the network device 101. In response to the protected reset 401, the embodiments maintain the communication functions of the network device 101. As a result, the network device 101 communicates with other network devices 101 using the communication functions. The embodiments further reset the network device 101 and/or portions of the network device 101 while maintaining the communication functions. As a result, the operation of the network device 101 and the network 100 is enhanced.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   detecting, by use of a reset controller, a protected reset at a network device;
   in response to the protected reset, maintaining Ethernet communication functions of a communication module, wherein the communication module comprises an embedded Ethernet switch and at least two Ethernet physical layers and communicates with other network devices using the communication functions; and
   in response to the protected reset, resetting the network device without resetting the communication module, wherein the embedded Ethernet switch is reset with a communication controller reset, and the at least two Ethernet physical layers are reset with a physical layer reset distinct from the communications controller reset.

2. The method of claim 1, wherein the protected reset is a firmware update reset in response to a firmware download for the network device.

3. The method of claim 1, wherein the protected reset is a configuration update reset in response to a configuration download for the network device.

4. The method of claim 3, wherein a module receiving the configuration download is reset.

5. The method of claim 1, wherein the protected reset is a local reset.

6. The method of claim 1, wherein one of the embedded Ethernet switch and the at least two Ethernet physical layers are reset in response to detecting the protected reset.

7. The method of claim 1, wherein the communication module is reset in response to a power reset.

8. The method of claim 1, wherein the protected reset is a reset and a local reset.

9. An apparatus comprising:
   hardware components, a memory, and/or a processor that perform:
   detecting a protected reset at a network device;
   in response to the protected reset, maintaining Ethernet communication functions of a communication module, wherein the communication module comprises an embedded Ethernet switch and at least two Ethernet physical layers and communicates with other network devices using the communication functions; and
   in response to the protected reset, resetting the network device without resetting the communication module, wherein the embedded Ethernet switch is reset with a communication controller reset, and the at least two Ethernet physical layers are reset with a physical layer reset distinct from the communications controller reset.

10. The apparatus of claim 9, wherein the protected reset is a firmware update reset in response to a firmware download for the network device.

11. The apparatus of claim 9, wherein the protected reset is a configuration update reset in response to a configuration download for the network device.

12. The apparatus of claim 11, wherein a module receiving the configuration download is reset.

13. The apparatus of claim 9, wherein the protected reset is a local reset.

14. The apparatus of claim 9, wherein the protected reset is a reset and a local reset.

15. A computer program product, the computer program product comprising a non-transitory computer readable storage medium having program code embodied therein, the program code readable/executable by a processor to perform:
   detecting a protected reset at a network device;
   in response to the protected reset, maintaining Ethernet communication functions of a communication module, wherein the communication module comprises an embedded Ethernet-switch and at least two Ethernet physical layers and communicates with other network devices using the communication functions; and
   in response to the protected reset, resetting the network device without resetting the communication module, wherein the embedded Ethernet switch is reset with a communication controller reset, and the at least two Ethernet physical layers are reset with a physical layer reset distinct from the communications controller reset.

16. The computer program product of claim 15, wherein the protected reset is a firmware update reset in response to a firmware download for the network device.

17. The computer program product of claim 15, wherein the protected reset is a configuration update reset in response to a configuration download for the network device.

18. The computer program product of claim 17, wherein a module receiving the configuration download is reset.

19. The computer program product of claim 15, wherein the protected reset is a local reset.

20. The computer program product of claim 15, wherein the protected reset is a reset and a local reset.

\* \* \* \* \*